United States Patent
Saleem et al.

(10) Patent No.: US 11,859,065 B1
(45) Date of Patent: *Jan. 2, 2024

(54) UP-CYCLING WASTE POLYPROPYLENE AS SUPERHYDROPHOBIC SHEETS

(71) Applicant: KING FAISAL UNIVERSITY, Al-Ahsa (SA)

(72) Inventors: Junaid Saleem, Al-Ahsa (SA); Safdar Hossain SK, Al-Ahsa (SA); Zubair Khalid Baig Moghal, Al-Ahsa (SA); Gordon McKay, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,985

(22) Filed: Apr. 12, 2023

(51) Int. Cl.
*C08J 11/08* (2006.01)
*C08J 7/04* (2020.01)
*C09D 123/12* (2006.01)
*C09D 5/08* (2006.01)
*C09D 5/16* (2006.01)
*C09D 7/20* (2018.01)

(52) U.S. Cl.
CPC ............ *C08J 7/042* (2013.01); *C08J 11/08* (2013.01); *C09D 5/08* (2013.01); *C09D 5/1681* (2013.01); *C09D 7/20* (2018.01); *C09D 123/12* (2013.01); *C08J 2323/12* (2013.01)

(58) Field of Classification Search
USPC ....................................................... 428/521
See application file for complete search history.

(56) References Cited

U.S. PATENT DOCUMENTS

2019/0256716 A1  8/2019  Deconinck et al.

FOREIGN PATENT DOCUMENTS

JP        2020050801 A      4/2020
WO   WO-2007048630 A1 *  5/2007  ........... C09D 123/10

OTHER PUBLICATIONS

WO-2007048630-A1 Machine translation (Year: 2007).*
Hadi, A.J., et al., "Potential solvent for reconditioning polyolefin waste materials", J Polym Eng 2012; 32: 585-591.
Dalhat, M.A. "Water resistance and characteristics of asphalt surfaces treated with micronized-recycled-polypropylene waste: Superhydrophobicity", Construction and Building Materials, vol. 285, May 24, 2021, 122870.

* cited by examiner

*Primary Examiner* — Terressa Boykin
(74) *Attorney, Agent, or Firm* — Nath, Goldberg & Meyer; Richard C. Litman

(57) ABSTRACT

Polypropylene (PP) superhydrophobic sheets and a fabrication method thereof are provided. Superhydrophobic PP sheets of varying thickness having a base layer and a top layer may be fabricated using recycled or waste PP, where the fabrication process uses 20% of total plastic waste to prepare said sheets having contact angles ranging from 140 to 160 degrees. The polypropylene (PP) superhydrophobic sheets may impart protective water-repellent properties against the elements.

12 Claims, 5 Drawing Sheets

UP-CYCLING WASTE POLYPROPYLENE AS SUPERHYDROPHOBIC SHEETS

BACKGROUND

1. Field

The disclosure of the present patent application relates to polypropylene (PP) superhydrophobic sheets and a fabrication method thereof produced using recycled or waste polypropylene.

2. Description of the Related Art

The produced amounts of plastic solid wastes continue to increase, despite increasing attempts to reduce, reuse, recycle, and recover. The increase is mainly due to the extensive manufacturing of plastic as packaging for the food industry and other applications. The lifespan of plastic wastes is very short (approximately 40% have lifespans<1 month). However, most plastic wastes can only be partly recycled into new products. Thus, a substantial amount of waste is generated daily. Therefore, the annual plastic waste growth would create serious environmental problems. Therefore, the environmental benefits of recycling and upcycling are mammoth, aside from minimizing the volume of discarded materials and waste being sent to landfill each year, it also reduces the need for production using new or raw materials which means a reduction in air pollution, water pollution, greenhouse gas emissions and often a conservation of global resources. The recycling process involves a dissolution/reprecipitation process which ties into the mechanical recycling techniques of thermoplastic polymers [polyethylene (PE), polypropylene (PP), PS, PET, and poly-vinyl chloride (PVC)], and plays an important role in recycling plastics.

Superhydrophobicity has gained considerable attention in surface science in the past 20 years. Superhydrophobicity demonstrates exceptional resilience to various weather conditions and is characterized by unique water-repellent properties, combined with a self-cleaning effect. Superhydrophobic sheets or coatings can be applied to glass, rooftops, lamp posts, high-rise walls, etc. to impart protective water-repellent and/or self-cleaning properties against the elements. Research studies have shown that superhydrophobic (SH) surfaces possess enhanced water-resistance, anti-icing, anti-corrosion, and even self-cleansing properties better than non-SH surfaces. Surface profile and water contact angle (WCA) of treated substrates generally define superhydrophobicity which is characterized by unique water-repellent properties, combined with a self-cleaning effect. Reference is made to the review article by R. Rioboo, B. Delattre, D. Duvivier, A. Vaillant and J. De Coninck, "Superhydrophobicity and liquid repellency of solutions on polypropylene", Adv. Colloid. Interfac., 2012, 175, 1-10.

Although spin-coating yields positive characteristics such as reproducible results with uniform surface and controlled thickness, it has hardly been explored to prepare superhydrophobic PP sheets. A possible explanation is that, firstly, PP is a semi-crystalline polymer and cannot be dissolved in any solvent at ambient temperature. Secondly, spin-coated PP films typically do not have sufficient strength to maintain their integrity without a supporting layer or a substrate. Thirdly, after coating a layer of PP on a substrate, it is difficult to peel off the layer as it binds with the substrate.

Despite the fact that polypropylene may be recovered from recycled plastic material, sourcing is relatively limited and/or costly and life cycle requirements tend to impose a reduction in consumption of polypropylene. There is thus a need to reduce the consumption of crystallized polymer in the preparation of superhydrophobic surfaces, while not substantially impairing the superhydrophobic properties of the material.

When seeking to provide superhydrophobic coating compositions, that is coating compositions that provide superhydrophobic properties to a substrate surface coated therewith, composite compositions comprising a hydrophilic polymer and a hydrophobic polymer may not be appropriate, because of inappropriate superhydrophobicity index (SHI) which is a measure of the percentage of surface area which actually is superhydrophobic.

Thus, new superhydrophobic sheets, as well as processes for producing them, solving the aforementioned problems are desired.

SUMMARY

The present subject matter relates to a method for making superhydrophobic sheets comprising waste polypropylene (PP) sing recycled material which is recovered from a waste plastic or polymer material derived from post-consumer and/or industrial waste. More specifically it relates to producing PP superhydrophobic sheets of varying thicknesses, where the process uses 20% of total plastic waste to prepare PP sheets with contact angles ranging from 140 to 160, and the method of making such sheets. The method includes depositing a solution of the recycled material on a substrate in multiple layers, removing the solvent, and separating the superhydrophobic sheet from the substrate. The such prepared superhydrophobic sheets with said high contact angles demonstrate exceptional resilience to various weather conditions and can be applied to glass, rooftops, lamp posts, high-rise walls, etc.

In one embodiment, the present subject matter is related to polypropylene (PP) superhydrophobic sheets. The composition of such sheets includes base and top layers of PP wherein the PP may comprise various types of waste and recycled PP including isotactic, atactic, syntactic, amorphous, and discarded virgin PP. The porous top layer provides maximum hydrophobicity with a contact angle ranging from 140 to 160 degrees while a nonporous base layer provides support and strength. The sheets can be used with and without adhesive tapes which can be pasted on the base layer. These sheets may have varied thickness, strength, roughness, and hydrophobicity depending on the end-user requirements. Such sheets or coatings can be applied as protection from water on glass, rooftops, tabletops, lamp posts, high-rise walls, etc., and/or onto glass for self-cleaning.

In another embodiment, the present subject matter method relates to a method of making a superhydrophobic sheet, the method comprising: dissolving polypropylene (PP) isolated from plastic waste in a solvent to form a clear polypropylene solution; pre-heating a solid substrate to a temperature below a boiling point of the solvent; applying the clear polypropylene solution onto the solid substrate followed by annealing to obtain a strong base layer; and applying another layer of the clear polypropylene solution onto the strong base layer without additional heating, thereby producing a superhydrophobic sheet. The superhydrophobic sheet can further be separated from the substrate.

In another embodiment, the present subject matter relates to a superhydrophobic sheet produced according to the present methods.

DETAILED DESCRIPTION OF THE PREFERRED EMBODIMENTS

Figure 1A:
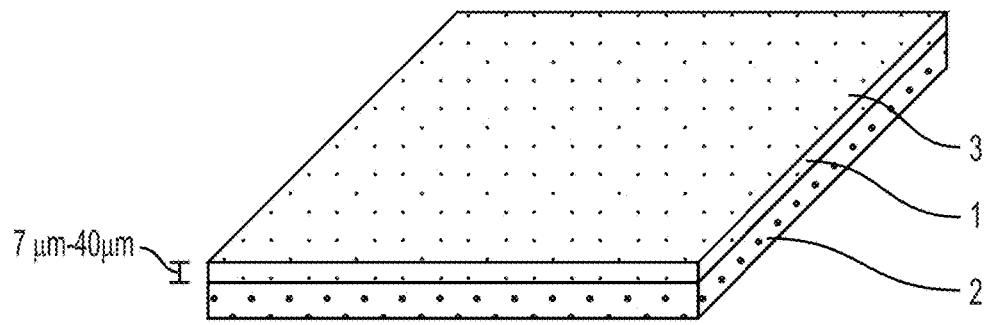
FIG. 1A shows a schematic representation of a weak base coating having micropores laid on a solid substrate.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

As used herein the term "superhydrophic surface" means a surface having i) a receding static water contact angle (a 50 μl water droplet on a flat surface in an essentially horizontal plane) of more than 135°, preferably more than 140° or more than 145°, more preferably from 145° to 160°, and ii) an advancing static water contact angle of more than 135°, preferably more than 140° or more than 145°, and more preferably from 145° to 160°, as measured by a Drop Shape Krüss Analyser and corresponding protocol and iii) preferably a water roll-off angle also called sliding angle (dynamic measure) of less than 10°, preferably less than 6°.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Additionally, as used in this application and unless stated otherwise, "virgin" means polypropylene supplied commercially in the form of granules (unused or firsthand) before being plasticized. "Waste" polymer includes when a virgin polymer is used in preparation of plastic products and some amount of the material is discarded until flowability is achieved; that discarded virgin polymer is considered waste polymer in the context of this application.

The terms "coating" and "sheet" and "layer" may be used interchangeably herein unless stated otherwise.

"Heated" or "hot" as used herein means above room temperature unless stated otherwise.

"Strong" means heated such that porosity of a polypropylene polymer coating is minimized, eliminated or essentially eliminated by melting the polymer and crosslinking the polymeric chains by increasing the intermolecular interactions.

The present subject matter is related specifically to upcycling polypropylene (PP) plastic waste into superhydrophobic sheets and a process for making such sheets that uses 20% of total plastic waste to prepare said sheets having contact angles ranging from about 140 to 160 degrees. The as-prepared polymeric material is in the form of superhydrophobic sheets with said high contact angles where such sheets or coatings demonstrate exceptional resilience to various weather conditions and can be applied to glass, rooftops, lamp posts, high-rise walls, etc.

In one embodiment, the present subject matter is related to polypropylene (PP) superhydrophobic sheets made from upcycled PP. The composition of such sheets includes base and top layers of PP. The porous top layer provides maximum hydrophobicity with a contact angle ranging from 140 to 160 degrees while the nonporous base layer provides support and strength.

In an embodiment the base layer or layers are each heated and annealed to achieve a strong, supportive nonporous characteristic before another base layer(s) is applied and heated, and the top layer is not heated and/or annealed, so that it retains a porous rough surface characteristic and a desired high contact angle.

In an embodiment the sheets can be used with and without adhesive tapes which can be pasted on the base layer. The sheets have varied thickness, strength, roughness, and hydrophobicity depending on the end-user requirements and can be applied as a protection from water on rooftops, tabletops, lamp posts, high-rise walls, etc.

In an embodiment, the superhydrophobic PP sheets are made from plastic waste, the plastic waste comprises recycled polypropylene and/or waste polypropylene, wherein the waste PP may include virgin or discarded virgin polypropylene, and the polypropylene may comprise isotactic, atactic, syntactic, and/or amorphous polypropylene. No wax is required, and no wax or other additive is added.

In an embodiment the superhydrophobic sheet herein will have two layers. One is the base layer, and the other is the top layer. But if an application requires a thicker base and/or a thicker overall sheet, then the base layers can be coated multiple times.

In an embodiment, the thickness of the base layer ranges from about 3 μm to about 170 μm. In another embodiment, a top layer of polypropylene can be coated on the base layer while the base layer and the PP top layer solution are hot. Then, the solvent is removed from the top PP layer under vacuum or air. The top PP layer is not additionally heated but uses only the remaining heat of the base layer such that the top layer is not annealed or strengthened, retains micropores, and possesses the high desired contact angle for superhydrophobicity. Further, no heating is required to remove any solvent. In an embodiment, the total thickness of the superhydrophobic sheet coatings can range from about 10 μm to about 200 μm, or about 7 μm to about 80 μm, and the tensile strength of the superhydrophobic coatings can range from about 5 MPa to about 70 MPa.

In another embodiment, the present subject matter method relates to a method of making a superhydrophobic sheet, the method comprising: dissolving polypropylene (PP) isolated from plastic waste in a solvent to form a clear polypropylene solution; pre-heating a solid substrate to a temperature below a boiling point of the solvent; applying the clear polypropylene solution onto the solid substrate followed by annealing to obtain a strong base layer; and applying another layer of the clear polypropylene solution onto the strong base layer without additional heating, thereby producing a superhydrophobic sheet. The superhydrophobic sheet can further be separated from the substrate.

In an embodiment, the process can utilize about 20% of total plastic waste to prepare sheets having contact angles ranging from about 140 to about 160 degrees. The as-prepared material can demonstrate exceptional resilience to various weather conditions and can be applied to rooftops, lamp posts, high-rise walls, etc.

In an embodiment, the plastic waste can come from recycled polypropylene, waste polypropylene, virgin polypropylene, or combinations thereof, and the polypropylene may comprise isotactic, atactic, syntactic, or amorphous polypropylene, or combinations thereof.

In an embodiment, the solvent can be selected from the group consisting of p-xylene, m-xylene, o-xylene, an isomeric mixture of xylenes, toluene, decalin, mesitylene, other compatible aromatic hydrocarbons, and mixtures thereof. In one embodiment, the solvent is a laboratory-grade isomeric mixture of xylene. Other, similar organic solvents may be useful in this regard. The organic solvent can be used to dissolve the polymers under reflux conditions.

In an embodiment, base and top layers can be formed using different coating application techniques. For example:
1. Base layer using spin coat and top layer using spin coat.
2. Base layer using slot die and top layer using slot die.
3. Base layer using spin coat and top layer using slot die.
4. Base layer using slot die and top layer using spin coat.

In an embodiment, the present superhydrophobic sheets can have two layers, one is the base layer and the other is the top layer. But if an application requires a thicker base, then the base layers can be coated multiple times. Each time, the base coat must be heated. Finally, the top layer is coated, which should not be heated.

In an embodiment, the process of forming the PP superhydrophobic sheets comprises dissolution of waste polypropylene(s) in an organic solvent at a temperature ranging from about 130° C. to 180° C. but below the boiling point of the solvent to form a polymer solution. In an embodiment, the ratio of the polypropylene to the organic solvent is in the range of about 1 mg/ml to about 300 mg/ml.

In another embodiment, the solid substrate may be selected from the group consisting of glass, copper, silica, alumina, and another metal. In an embodiment, the solid substrate is preheated to have a surface temperature before the spin coating process begins ranging from about 0° C. to about 190° C., but below the boiling point of the solvent.

In an embodiment, the polymer solution can be poured onto the solid substrate and allowed to spin coat at a speed ranging from about 100 to about 6000 rpm for a period of about 1 minute to about 15 minutes, or until the solvent is removed and a film formed. The excess polymer and solvent can be collected from a drain. Alternatively, the polymer solution can be drop cast and spread into a thin film onto the substrate using a slot die coater or doctors blade technique.

After the completion of the base coating, the solid substrate with base coating can be detached from the coating device or platform and allowed to dry under vacuum or air to remove traces of organic solvents present inside the pores, if any. The thickness of the porous unheated base layer can range from about 3 μm to about 170 μm, from about 5 μm to about 100 μm, or from about 7 μm to about 40 μm. Then the base layer can be subjected to heat at a temperature ranging from about 150° C. to about 180° C. for a period ranging from about 10 seconds to about 20 minutes to eliminate pores and achieve a strong base layer. If desired, similar base layer coatings can be repeated until a required base layer thickness is achieved. In this regard, the thickness of the heated base layer can range from about 3 μm to about 170 μm, from about 3 μm to about 150 μm, from about 5 μm to about 80 μm, or from about 7 μm to about 30 μm.

Lastly, a top layer of the polypropylene solution can be coated on the base layer while the base layer is hot. Then, the solvent can be removed under vacuum or air. The top layer should not be further heated. The thickness of the top layer can range from about 7 μm to about 170 μm, from about 9 μm to about 100 μm, or from about 12 μm to about 40 μm.

The combined stacked layers can be peeled off collectively from the substrate using a blade, a tweezer, or forceps without further heating to achieve the polypropylene (PP) superhydrophobic sheet. The thickness of the PP superhydrophobic coating or sheet of combined base layer and top layer can range from about 10 μm to about 200 μm, from about 12 μm to about 140 μm, from about 15 μm to about 80 μm, or from about 7 μm to about 80 μm. The tensile strength of the superhydrophobic coatings can range from about 5 MPa to about 70 MPa, and the contact angle, including water contact angle, on the superhydrophobic coating surface can be in the range of about 140° to about 160°.

In an embodiment, a method of making a PP superhydrophobic coating comprises dissolving polypropylene in a compatible solvent to form a hot polymer solution; stirring the hot polymer solution at an optimum temperature for a time ranging from about 10 minutes to about 40 minutes; pouring the hot polymer solution onto a solid substrate; coating the solid substrate with the hot polymer solution using a spin coating technique for a time ranging from about 2 minutes to about 15 minutes at an rpm in the range of about 100 rpm to about 6000 rpm, or until the solvent is removed from the coated layer; alternatively coating the solid substrate with hot polymer solution using a doctors blade or drop cast or slot die technique for a time ranging from about 3 seconds to about 2 minutes with a drag speed ranging from about 0.1 cm/sec to about 10 cm/sec, collecting the excess polymer and the solvent from a drain; removing the solid substrate having the base coating layer thereon from the coater or coating apparatus; subjecting the coating layer while still on the substrate to heat ranging from about 150° C. to about 180° C. for a time period ranging from about 10 seconds to about 20 minutes to achieve a heated strong base layer; coating a second layer on the strong base layer using a similar or different but suitable coating technique and allowing the solvent to dry from the coating either by vacuum or air; and peeling off the combined layers collectively from the substrate using a blade, a tweezer or forceps to obtain the superhydrophobic coating.

In an embodiment, the step of applying the clear polypropylene solution onto the solid substrate followed by annealing is conducted by spin coating and comprises: a first spin coating step at a first speed for about 10 seconds to obtain a first film with a first thickness; a second spin coating step at a second speed which is higher than the first speed for about 60 seconds to obtain a second film with a second thickness; a third spin coating step at a third speed which is higher than the second speed for about 60 seconds to obtain a third film with a third thickness and ensure complete removal of the solvent; and heating the third film to obtain the strong base layer having a thickness of about 3 μm to about 150 μm. In an embodiment, the first speed is about 400 rpm, the second speed is about 1000 rpm, the third speed is about 3000 rpm, and the heating is conducted at about 170° C.

In another embodiment, the step of applying another layer of the clear polypropylene solution onto the strong base layer is conducted by spin coating and results in formation of a top layer having a thickness of about 7 μm to about 170 μm.

In a further embodiment, the strong base layer and the top layer can be taken together to form the superhydrophobic sheet having a thickness of about 10 μm to about 200 μm and a tensile strength of about 5 MPa to 70 MPa. In certain embodiments, for example, where multiple base layers are formed, the thickness of the superhydrophpbic sheet can be from about 20 μm to about 1 mm.

By using multiple coating layers, the mechanical strength of the superhydrophobic sheet can be improved. In certain embodiments, the present methods can overcome the shortcomings of spin-coating for semi-crystalline polymers by optimizing their strong dependency on melting temperature and heating time.

In further embodiments, the present methods can comprise an additional step of separating the superhydrophobic sheet from the substrate. According to this embodiment, the superhydrophobic sheet can be peeled from the substrate using a blade, a tweezer or forceps without further heating to achieve freestanding superhydrophobic films.

In a further embodiment, the superhydrophobic film can be used for anti-corrosion or anti-wetting applications.

Referring to the drawings, FIG. 1A shows a schematic cross-sectional view of an incomplete superhydrophobic coating laid on a solid substrate. FIG. 1A represents a schematic cross-sectional view of base layer 1 of a superhydrophobic coating without strength while still porous (having pores or micropores 3) and not yet heated laid on a solid substrate A base layer can be prepared from plastic waste comprising recycled polypropylene (PP), waste polypropylene recovered from waste plastic material derived from post-consumer and/or industrial waste and including virgin PP, or combinations thereof. Said plastic is dissolved in a hot suitable solvent to form a solution and formed into a thin layer on a solid substrate by using slot die, drop cast, doctors' blade, or spin coating techniques. The thickness of the porous unheated base layer 1 can range from about 3 μm to about 170 μm, from about 5 μm to about 100 μm, or from about 7 μm to about 40 μm.

Figure 1B:
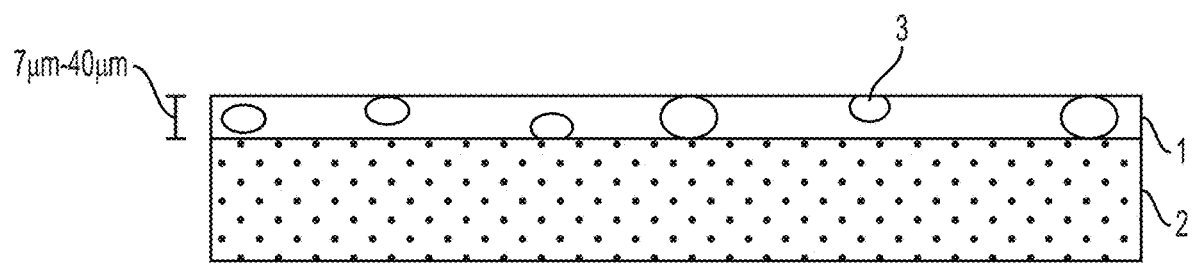
FIG. 1B shows a schematic cross-sectional side view of the weak porous base coating layer laid on a solid substrate of FIG. 1A.

FIG. 1B shows a cross-sectional side view of FIG. 1A.

Figure 2A:
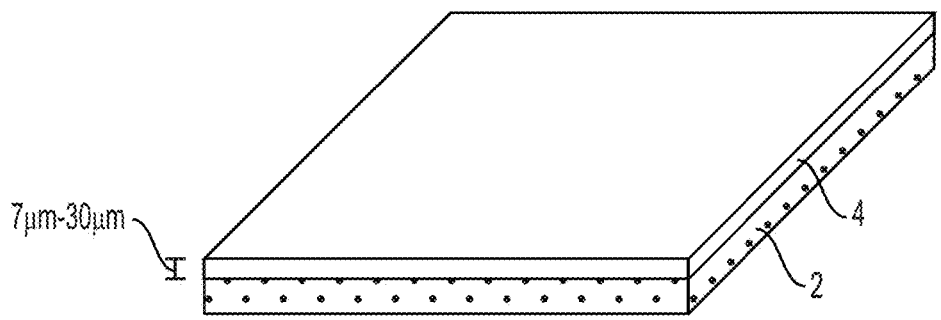
FIG. 2A shows a schematic representation of a strong non-porous base coating layer laid on a solid substrate.

FIG. 2A shows a cross-sectional view of a base coating with sufficient strength laid on a solid substrate. FIG. 2A represents a schematic cross-sectional view of base layer 4 of a superhydrophobic coating laid on a solid substrate 2, with strength. The as-prepared base layer without strength 1 was subjected to heat to a temperature ranging from about 150° C. to about 180° C. Upon heating, the base layer achieves strength by melting the polymer and crosslinking the polymeric chains by increasing the intermolecular interactions. Thus, a strong base layer 4 with no pores/micropores is achieved by heating base layer 1 having pores/micropores. The thickness of the base layer with strength 4 ranges from about 3 µm to about 150 µm, from about 5 µm to about 80 µm, or from about 7 µm to about 30 µm.

Figure 2B:
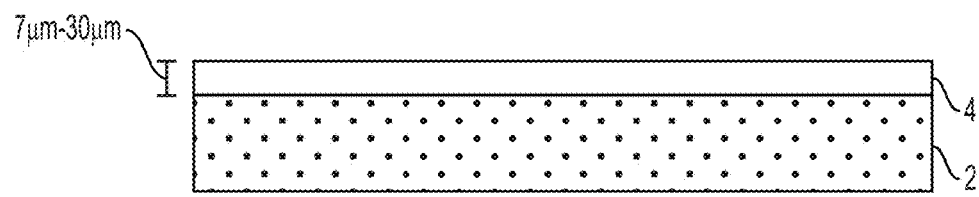
FIG. 2B shows a schematic cross-sectional side view of a strong base coat layer laid on the solid substrate of FIG. 2A.

FIG. 2B shows a schematic cross-sectional side view of FIG. 2A.

Figure 3A:
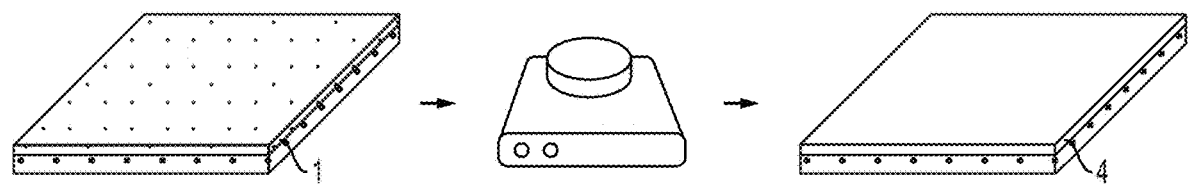
FIG. 3A shows a schematic representation of heating a base coat layer laid on the solid substrate.

FIG. 3A shows a schematic representation of heating a base coat layer laid on the solid substrate. FIG. 3A represents heating a base coat layer 1 without strength laid on the solid substrate to achieve a base coat layer 4 with strength.

Figure 3B:
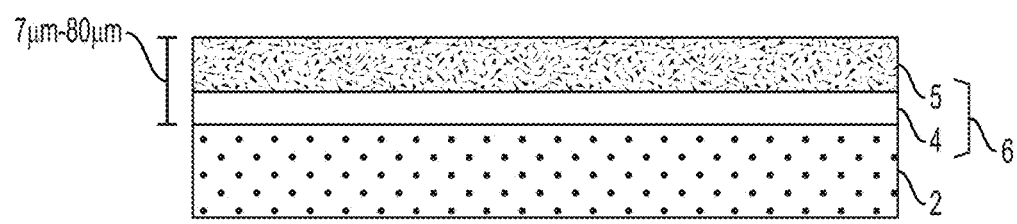
FIG. 3B shows a schematic cross-sectional side view of a base coat layer and top coat layer of a superhydrophobic coating laid on the solid substrate.

FIG. 3B shows a schematic cross-sectional side view of a base coat layer and top coat layer of a superhydrophobic coating laid on the solid substrate. FIG. 3B represents a schematic cross-sectional side view of a superhydrophobic coating 6 laid on the solid substrate 2. The heated strong base layer 4 is further coated with the hot PP polymer solution comprising recycled polypropylene and/or waste propylene at a temperature ranging between about 130° C. and about 180° C. to form a top layer 5. The coating is carried out using slot die, drop cast, doctors' blade, or spin coating techniques. The thickness of top layer 5 ranges from about 7 µm to about 170 µm, from about 9 µm to about 100 µm, or from about 12 µm to about 40 µm. The thickness of the combined base layer 4 and top layer 5 ranges from about 10 µm to about 200 µm, from about 12 µm to about 140 µm, from about 15 µm to about 80 µm, or from about 7 µm to about 80 µm. The combined base layer 4 and top layer 5 result in a superhydrophobic coating 6 which is not yet peeled off from the substrate 2.

Figure 4:
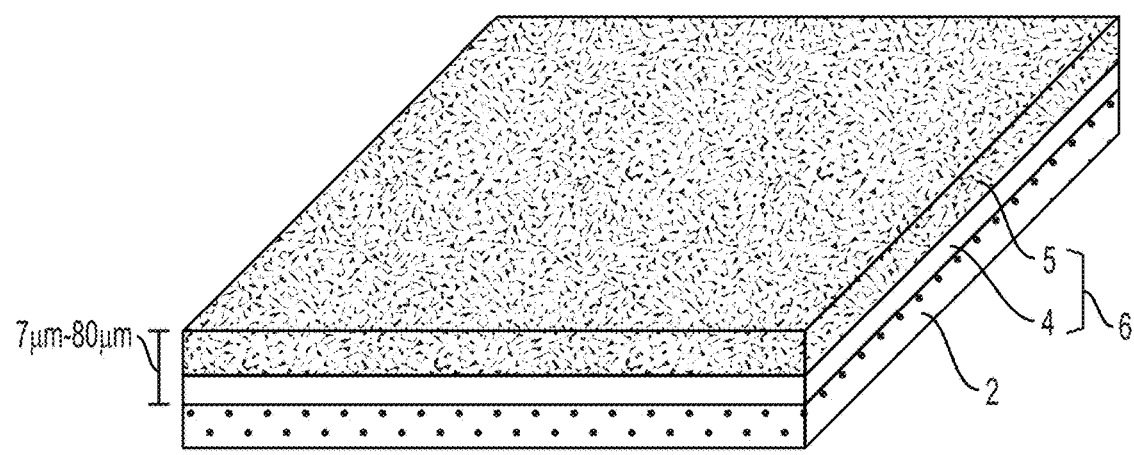
FIG. 4 shows a schematic cross-sectional view of a base coat layer and top coat layer of a superhydrophobic coating laid on the solid substrate.

FIG. 4 shows a schematic cross-sectional view of a base coat layer and top coat layer of a superhydrophobic coating laid on the solid substrate. FIG. 4 represents a schematic cross-sectional view of a superhydrophobic coating 6 on the solid substrate 2. The combined strong base layer 4 and top layer 5 make up total superhydrophobic coating sheet 6. See FIG. 3B for a cross sectional side view.

Figure 5A:
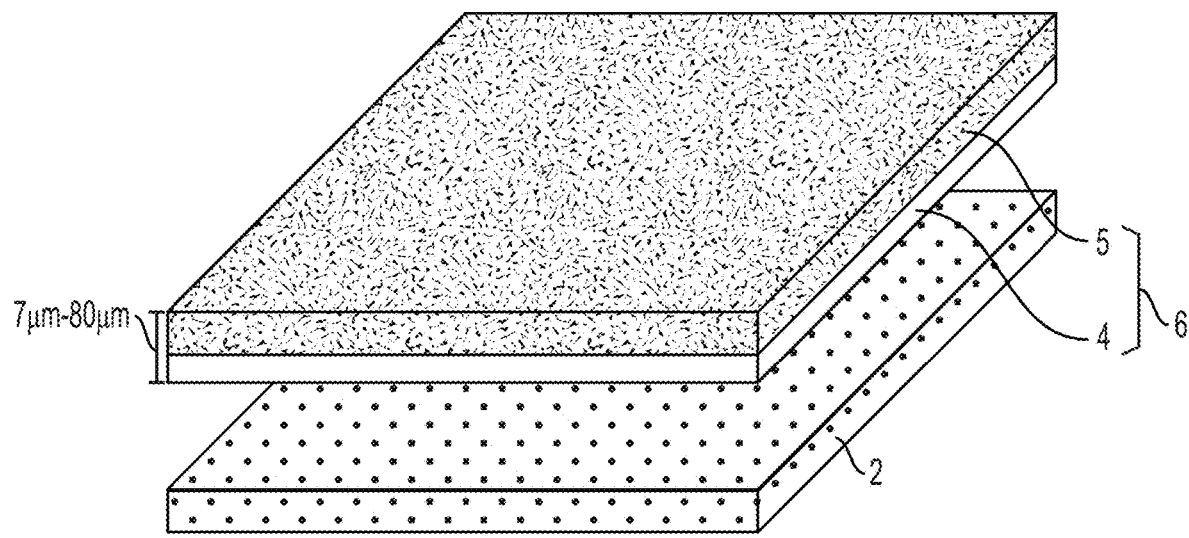
FIG. 5A shows a schematic representation of base layer and top layer of a formed and completed superhydrophobic coating sheet separated collectively from the solid substrate.

FIG. 5A shows a schematic representation of base layer and top layer of a formed and completed superhydrophobic coating sheet separated collectively from the solid substrate. FIG. 5A represents a schematic cross-sectional view of a superhydrophobic coating 6 separated from the solid substrate 2. The combined strong base layer 4 and top layer 5 were peeled off from the substrate using forceps, tweezers, or a blade. The thickness of top layer 5 ranges from about 7 µm to about 170 µm, from about 9 µm to about 100 µm, or from about 12 µm to about 40 µm. The thickness of the combined base layer 4 and top layer 5 ranges from about 10 µm to about 200 µm, from about 12 µm to about 140 µm, from about 15 µm to about 80 µm, or from about 7 µm to about 80 µm. The combined strong base layer 4 and top layer 5 resulted in a superhydrophobic coating 6 peeled off from the substrate 2 to achieve a superhydrophobic coating.

Figure 5B:
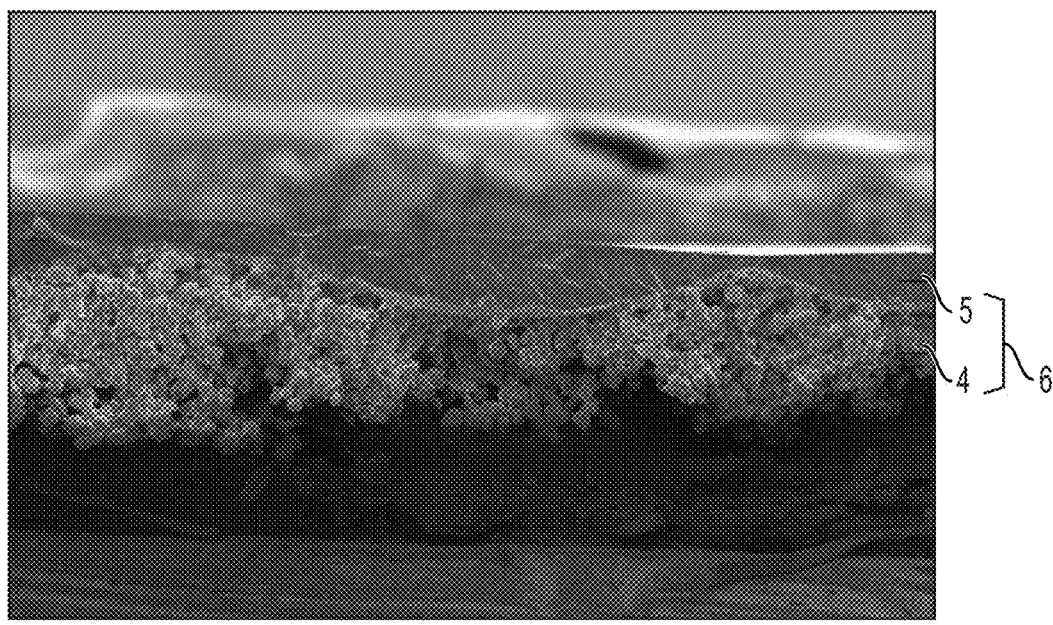
FIG. 5B shows SEM image of superhydrophobic sheet showing top layer and base layer.

FIG. 5B shows a SEM image of superhydrophobic sheet showing top layer and base layer. FIG. 5B represents an SEM image of a superhydrophobic sheet with both base layer and top layer. The base layer and top layer comprise polypropylene. The base layer is not porous and the top layer is porous with roughness.

Figure 6:
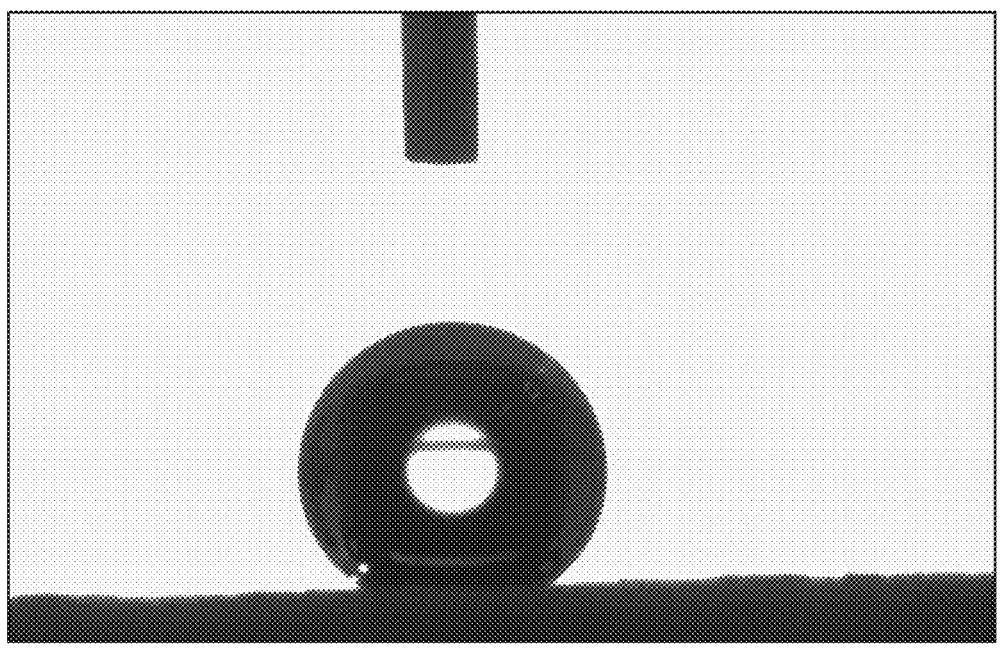
FIG. 6 shows a contact angle of water with superhydrophobic sheets.

FIG. 6 shows a contact angle of water with superhydrophobic sheets. FIG. 6 represents the contact angle of water over the surface of superhydrophobic sheets. The angle was measured to be 148°. The contact angle on the superhydrophobic surface is in the range of 140°-160°.

Figure 7:
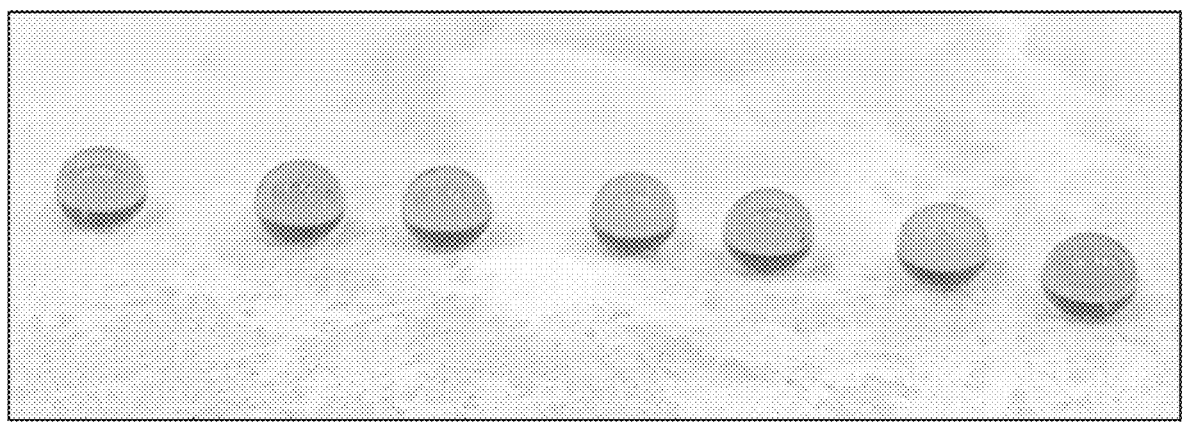
FIG. 7 shows water droplets on a superhydrophobic coating showing superhydrophobicity.

FIG. 7 Shows water droplets on a superhydrophobic coating showing superhydrophobicity. FIG. 7 represents the superhydrophobicity of the superhydrophobic sheets that do not allow the water to stick to the surface. The water contact angle is in the range of 140°-160°.

EXAMPLES

Example 1:

100 gm of waste polypropylene was placed in a round bottomed flask and dissolved in one liter of xylene under reflux conditions at a temperature of 130° C. for a time of 20 minutes. A clean glass plate of sides 5 cm each was taken and heated to a temperature of 110° C. and was placed on a spin coater chuck. The hot polymer solution was poured on to the glass plate and spin coated at a gradient speed of 400 rpm for 10 seconds, followed by 1000 rpm for 60 seconds, followed by 3000 rpm for 60 seconds. The excess solvent and polymer solution was collected from the drain. After completion of the spin coating, the substrate was separated from the chuck and the base layer was heated to a temperature of 170° C. for a period of 5 minutes on a Heidolph hot plate. Then the hot glass plate with polymer base layer was placed on the chuck and the hot polypropylene solution was poured on the hot base layer to form a top layer and allowed to spin coat at similar speed and time. After the spin coating, the glass substrate with combined top and base layers were detached from the chuck and the coatings were collectively separated from the substrate resulting in a superhydrophobic sheet.

Example 2:

If there is a requirement of superhydrophobic sheet with a thickness of 200 µm, one base layer and one top layer is insufficient. To achieve this, multiple base coating layers must be applied to achieve a final thick base layer. Then, finally a top layer is coated. For example, if each layer gives a thickness of 40 µm, the final base layer should have a thickness of 160 µm and top layer thickness as 40 µm. The following steps are followed to obtain such a superhydrophobic coating:

(a) a first layer with 40 µm is achieved, followed by heating, (b) a second coating of 40 µm is coated achieving 80 µm thickness, followed by heating, (c) a third coating of 40 µm is coated achieving 120 µm thickness, followed by heating, (d) a fourth coating of 40 µm is coated achieving 160 µm thickness, followed by heating, where the final base layer is formed, and (e) a fifth and last layer, the top layer, of 40 µm is coated achieving a total coating or sheet thickness of 200 µm, thus, achieving a superhydrophobic sheet with a thickness of 200 µm.

It is to be understood that the PP superhydrophobic sheets, use, method of making, and properties of said sheets are not limited to the specific embodiments or examples described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A freestanding superhydrophobic sheet comprising:
a strong, nonporous support base layer comprising polypropylene (PP) isolated from plastic waste made through spin casting followed by annealing and having a thickness of 3 µm to 170 µm; and
a porous top layer comprising polypropylene (PP) isolated from plastic waste made through spin casting on the strong, nonporous support base layer, and comprising a superhydrophobic surface and having a thickness of 7 µm to 170 µm, wherein the superhydrophobic sheet has a total thickness of 10 µm to 340 µm and is peeled off from the solid substrate.

2. The superhydrophobic sheet of claim 1 wherein the polypropylene (PP) isolated from plastic waste comprises isotactic, atactic, syntactic, or amorphous polypropylene or combinations thereof.

3. The superhydrophobic sheet of claim 1 wherein the superhydrophobic surface has a contact angle ranging from about 140° to about 160°.

4. The superhydrophobic sheet of claim 1 wherein the sheet has a tensile strength of about 1 MPa to about 80 MPa.

5. The superhydrophobic sheet of claim 1, wherein the sheet has a total thickness of about 10 µm to about 340 µm.

6. The superhydrophobic sheet of claim 1, wherein the sheet may be used to impart protective water-repellent properties against the elements.

7. The superhydrophobic sheet of claim 1, wherein the superhydrophobic sheet can be used for anti-corrosion or anti-wetting applications.

8. The superhydrophobic sheet of claim 1, wherein the superhydrophobic sheet is self-adhesive.

9. The superhydrophobic sheet of claim 1, wherein the base layer comprises from one to five separately applied base layers.

10. The superhydrophobic sheet of claim 9, having a thickness of about 20 µm to about 1 mm.

11. A freestanding superhydrophobic sheet produced according to a method comprising:

dissolving polypropylene (PP) isolated from plastic waste in a solvent to form a clear hot polypropylene solution;

pre-heating a solid substrate to a temperature below a boiling point of the solvent;

applying the clear hot polypropylene solution onto the heated solid substrate followed by spin casting for a time in the range of 30 seconds to 10 minutes, at a speed ranging from 300 to 3500 rpm, followed by annealing to a temperature above a melting point of the polypropylene to obtain a hot, strong, nonporous base layer having a thickness of about 3 µm to about 170 µm; and applying another layer having a thickness of about 7 µm to about 170 µm of the clear hot polypropylene solution onto the hot, strong, nonporous base layer through spin casting for a time in the range of 30 seconds to 10 minutes, at a speed ranging from 300 to 3500 rpm without additional heating, thereby producing the superhydrophobic sheet which is peeled off from the solid substrate, wherein the superhydrophobic sheet has a total thickness of about 10 µm to about 340 µm.

12. A method for improving surface superhydrophobicity of a product, comprising:

providing a supply of the superhydrophobic sheets of claim 1; and deploying an effective length of the superhydrophobic sheets onto an area of the product to be protected from moisture and water.

* * * * *